United States Patent [19]

Sakai et al.

[11] Patent Number: 4,459,006
[45] Date of Patent: Jul. 10, 1984

[54] FOCUSING DEVICE FOR OPTICAL SYSTEM

[75] Inventors: Shinji Sakai, Tokyo; Takashi Kawabata, Kanagawa, both of Japan

[73] Assignee: Canon Kabushiki Kaisha, Tokyo, Japan

[21] Appl. No.: 475,369

[22] Filed: Mar. 14, 1983

[30] Foreign Application Priority Data

Mar. 17, 1982 [JP] Japan ................................. 57-40733

[51] Int. Cl.³ .............................................. G03B 3/10
[52] U.S. Cl. ................................... 354/406; 354/400; 354/402

[58] Field of Search ............... 354/400, 401, 402, 403, 354/404, 405, 406, 407, 408, 409

[56] References Cited

U.S. PATENT DOCUMENTS 4,341,953 7/1982 Sakai et al. ..................... 354/406 X Primary Examiner—Michael L. Gellner
Attorney, Agent, or Firm—Toren, McGeady and Stanger

[57] ABSTRACT

A focusing device for an optical system detects a continuous photographing state and allows no focusing operation when a degree of defocus exceeds a prescribed value during the continuous photographing operation.

1 Claim, 9 Drawing Figures

§ 1

FOCUSING DEVICE FOR OPTICAL SYSTEM

BACKGROUND OF THE INVENTION

1. Field of the Invention

The present invention relates to a focusing device for an optical system and more particularly to a photographic camera which is provided with an automatic focusing device capable of performing a focusing operation for continuous photographing.

2. Description of the Prior Art

In the conventional cameras of the type using a focusing device arranged to resume a focusing operation following changes in the position of an object the distance to which is to be measured, etc., the photographed picture is blurred by the restart of the focusing operation when the above stated following action is inappropriate during a continuous photographing operation. In such an instance, if the camera is a still picture camera, some of the photographs taken after the start of the focusing operation and before the end thereof would become blurry.

SUMMARY OF THE INVENTION

It is an object of the present invention to provide a focusing device for a camera which is capable of solving the above stated problem of the prior art device.

It is another object of the invention to provide a focusing device which is capable of improving a camera in its operability when applied to the camera.

An object to which the distance is to be measured does not vary very much during a continuous photographing operation in respect to the distance thereto. The present invention is based on this. A feature of the focusing device according to the invention resides in that any focusing operation is inhibited when the above stated following action is just temporarily gone awry. In other words, in accordance with the invention, a focusing operation for a great defocusing degree is inhibited during a continuous photographing operation.

These and further objects and features of the invention will become apparent from the following detailed description of preferred embodiment thereof taken in conjunction with the accompanying drawings.

DETAILED DESCRIPTION OF THE PREFERRED EMBODIMENT

Figure 1:
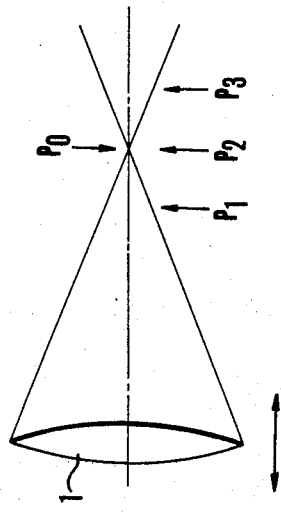
FIG. 1 is an illustration of an optical concept showing the operating principle of the present invention.

The operating principle of the invention is as shown in FIG. 1 as an optical concept. A lens 1 is moved back and forth along an optical axis to have an image formed at a point P0 which is equivalent to an anticipated imaging plane. Therefore, sensors are arranged also before and after the point P0, for example, at points P1, P2 and P3. The sharpness of the image formed at each of these points P1, P2 and P3 is converted into an electrical signal by means of these sensors. The different degrees of image sharpness are compared and processed to obtain through computation a degree of defocus from the anticipated imaging plane. Then, the lens 1 is moved according to this degree of defocus.

Figure 2:
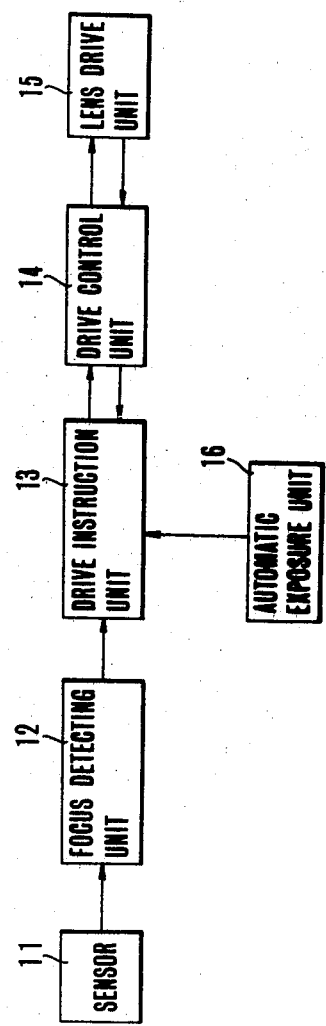
FIG. 2 is a block diagram showing a camera which is provided with an automatic focusing device as an embodiment example of the invention.

FIG. 2 is a block diagram showing the essential parts of a camera having an automatic focusing device as an embodiment of the invention. The embodiment includes the above stated sensor arrangement 11 which produces an electrical signal corresponding to the defocus degree of an image formed before or after the anticipated imaging plane; a focus detecting unit 12 which receives the electrical signal from the sensor arrangement 11 to compute the degree of defocus and determines whether the image is in-focus; a drive instruction unit 13 which receives the degree of defocus computed by the focus detecting unit 12 and computes a lens driving extent required for accurately and promptly focusing the lens 1; a drive control unit 14 which controls a lens drive unit 15 as much as the driving extent computed by the drive instruction unit 13; and an automatic exposure (AE) unit 16 which produces a signal indicative of that the camera is in a continuous photographing operation. The automatic exposure unit 16 is arranged to instruct the drive instruction unit 13 to inhibit any focusing operation when the degree of defocus is excessively great at the time of a continuous photographing operation.

Figure 3:
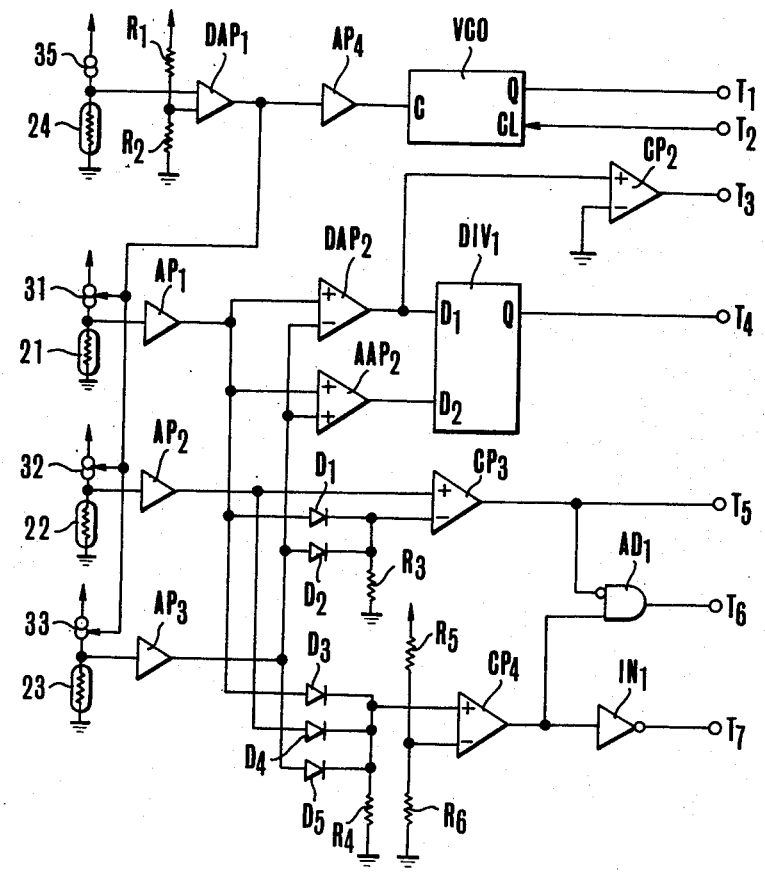
FIG. 3 is a circuit diagram showing sensor arrangement and the focus detecting unit of FIG. 2 as an embodiment example of the invention.

FIG. 3 is a circuit diagram showing by way of example the sensor arrangement 11 and the focus detecting unit 12 shown in FIG. 2. The arrangement of FIGS. 3-6 has been disclosed in a preceding patent application filed by the presnet applicant. Therefore, the details of it is omitted from the following description. Referring to FIG. 3, sensors 21, 22 and 23 are disposed respectively at the points P1, P2 and P3 of FIG. 1. There is provided another sensor 24 which is arranged to measure the brightness of the distance measuring zone for stabilization of signals from the sensors 21, 22 and 23. Constant current circuits 31, 32, 33 and 35 are arranged to supply constant currents respectively to the sensors 21, 22, 23 and 24. A differential amplifier DAP1 amplifies a difference between a voltage corresponding to the brightness of the distance measuring zone detected by the sensor 24 and a reference voltage set by means of resistors R1 and R2 and then supplies a signal corresponding to the brightness of the distance measuring zone to an amplifier AP4 and the constant current circuits 31, 32 and 33. These constant current circuits 31, 32 and 33 are controlled by the signal from the differential amplifier DAP1 in such a manner that the currents supplied to the sensors 21, 22 and 23 increase or decrease according as the brightness of the distance measuring zone increases or decreases and the sensors supply amplifiers AP1, AP2 and AP3 with signals corresponding to the degrees of sharpness of images formed at the points P1, P2 and P3 irrespective of the brightness. The sharpness signals representing the degrees of sharpness of images at the points P1, P2 and P3 are then amplified by these amplifiers AP1, AP2 and AP3 respectively. The difference between the sharpness signals of the front and rear points P1 and P3 located before and after the anticipated focal plane and the sum of these sharpness signals are obtained by a differential amplifier DAP2 and an addition amplifier AAP2. There is provided a known divider DIV1 which normalizes the sharpness of the object to be photographed by dividing the sharpness difference signal obtained through the differential amplifier DAP2 representing the difference between the image sharpness degree obtained in front and in rear of the anticipated focal plane with the sharpness sum signal obtained through the addition amplifier AAP2 representing the sum of the image sharpness degrees obtained in front and in rear of the anticipated focal plane. With the sharpness of the object normalized in this manner, the divider DIV1 produces a signal which is proportional to a distance from the front and rear points to the imaging point, i.e. a defocus extent signal, and supplies the signal to a terminal T4. A comparator CP2 receives the sharpness difference signal from the differential amplifier DAP1 and produces a defocus direction signal the level of which becomes high when the image sharpness at the front point is greater than that of the rear point and low when the latter is greater than the former. The defocus direction signal can be supplied to a terminal T3. It is a disadvantage of the above stated defocus extent signal supplied from the divider DIV1 to the terminal T4 that the signal is accurately determined only when the imaging point is located between the points P1 and P3 and that the degree of defocus can be hardly determined when the blurred degree of the image is excessive. To solve this problem, the embodiment includes the following arrangement: A comparator CP3 receives the larger of the sharpness signal representative of the degree of sharpness at the point P1 produced from the amplifier AP1 and the sharpness signal representative of sharpness at the point P3 produced from the amplifier AP3, the larger sharpness signal being supplied to an inversion input terminal of the comparator CP3 through diodes D1 and D2 and a resistor R3. The comparator CP3 then compares this larger sharpness signal with the sharpness signal which is representative of sharpness at the point P2 and is produced from the amplifier AP2. The comparator CP3 produces a defocus extent determining signal of a high level when the latter is larger than the former, that is, the comparator indicates that the defocus extent signal supplied at the terminal T4 from the divider DIV1 when the imaging plane is located at an internal division point between the points P1 and P3 in front and in rear of the anticipated focal plane is of an established value and supplies this defocus extent determining signal to a terminal T5. At another comparator CP4, the largest value of the sharpness signals produced from the amplifiers AP1, AP2 and AP3 representing the sharpness degrees at points P1, P2 and P3 and obtained through diodes D3, D4 and D5 and a resistor R4 is compared with a reference value which is set by means of resistors R5 and R6. When the result of comparison indicates a sufficient degree of sharpness, the comparator CP4 produces a high level signal therefrom. When the level of the signal from the comparator CP4 is high, an inverter circuit IN1 inverts this signal and supplies a signal of a low level to a terminal T7 to indicate that the sharpness signal is of an established value. An AND circuit AD1 obtains a logical product from the inverted value of the output signal of the comparator CP3 and the output signal of the comparator CP4. When the imaging plane is not located at an internal division point between the points P1 and P3 though the degree of sharpness is sufficient, the AND circuit AD1 supplies a high level signal to a terminal T6 indicating that it is only the direction that is determined. In the case of an excessively blurred condition where no reliable information is obtainable about the sharpness of images formed at the points P1, P2 and P3, the output level of the comparator CP4 becomes low and is inverted by the inverter circuit IN1 to make the level of the terminal T7 high to indicate that the sharpness signal is not of an established value. The output signal of the differential amplifier DAP1 which corresponds to the brightness of the distance measuring zone is amplified by an amplifier AP4. The signal which corresponds to the brightness of the distance measuring zone and is thus amplified by the amplifier AP4 is received by a known voltage control oscillator VCO. The oscillator VCO supplies a strobing signal of quick repeating speed to the terminal T1 when the brightness is high and a strobing signal of low repeating speed to the terminal T1 when the brightness is low. The signal thus serves as a timing signal to eliminate erroneous actions for a stable result of distance measurement. The clear signal input terminal CL of the voltage control oscillator VCO is arranged to receive, during a lens driving operation by a motor, a drive signal of a high level through a terminal T2 from the drive control unit 14 which will be described later herein. The input to the clear signal input terminal CL thus clears the voltage control oscillator VCO to prevent generation of an erroneous strobing signal and erroneous distance measurement during the lens driving operation. In cases where storage type elements, such as charge coupled devices (CCD's) are employed in place of the sensors 21, 22 and 23, accumulation of erroneous sharpness signals can be prevented with the level of this lens drive signal arranged to become low when the lens is stopped to allow sharpness signals for a new object to enter the storage sequence of the above stated elements. In the case of a distance measuring device using light sensitive elements of the storage type such as CCD, the pulses corresponding to timing for establishing or determining a result of distance measurement serve as the strobing signal of the terminal T1. In a distance measuring device of a completely different type, such as a device of the correlation type, the range in which computation of the degree of defocus can be determined and established is also limited. In the case of the correlation type, the computation reliability lowers when deviation takes place to a great extent and the degree of defocus becomes great at the time of great blurring. In the case of flat object, for example, the reliability of a determined direction will be lost and a signal indicative of an undetermined degree of defocus will be produced in the same manner as in the case of the device using CCD's.

Figure 4:
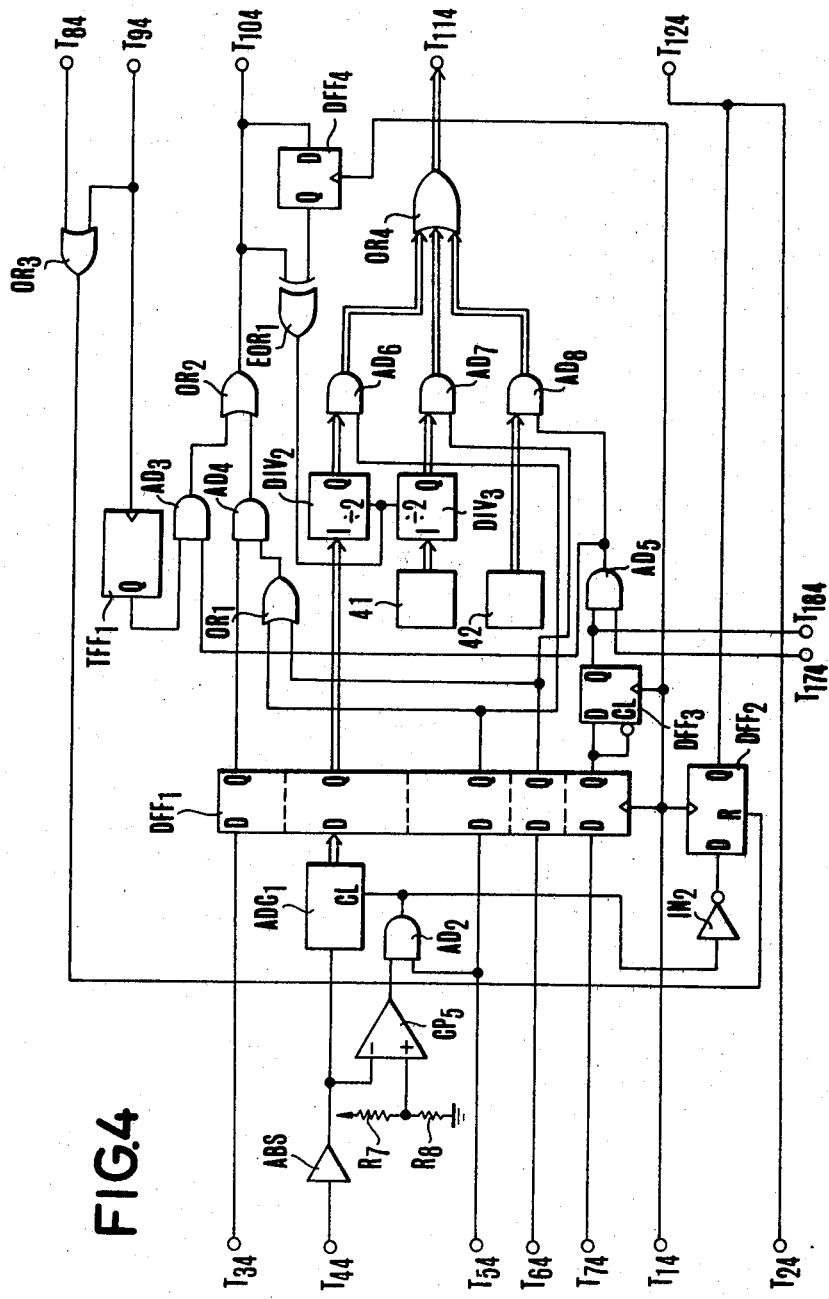
FIG. 4 is a circuit diagram showing a drive instruction unit of FIG. 2 as an embodiment example of the invention.

The circuit arrangement of the drive instruction unit 13 which is shown in FIG. 2 is as shown by way of example in FIG. 4. Referring to FIG. 4, the drive instruction unit 13 is provided with terminals T14, T24, T34, T44, T54, T64 and T74 which are connected respectively to the terminals T1–T7 of FIG. 3. A known absolute value circuit ABS is arranged to obtain the absolute value of a defocus degree or extent signal obtained at the terminal T44. The defocus degree signal which is made into an absolute value by the absolute value circuit ABS is arranged to be converted into a digital value by an A/D converter ADC1. Further, the defocus degree signal made into an absolute value by the absolute value circuit ABS is compared by a comparator CP5 with a reference level set by means of resistors R7 and R8. The comparator CP5 produces a high level signal when the absolute value signal represents an in-focus state or is within an automatic focusing (AF) convergence range. The AF convergence range sometimes can be widened depending on the photo-taking aperture value of the lens. In such a case, the time required before completion of an AF operation can be shortened by increasing the reference level (or convergence level) set by the resistors R7 and R8 for quicker convergence. An AND circuit AD2 obtains a logical product of the signal produced from the comparator CP5 and the defocus degree determining signal which is the output of the comparator CP3 shown in FIG. 3. The AND circuit AD2 is arranged to produce a signal of a high level when the logical product thus obtained represents an in-focus state or is within the AF convergence range. The AND circuit AD2 is connected to the clear signal input terminal CL of the A/D converter ADC1 and, since no A/D conversion is required at the time of in-focus or a state of being within the AF convergence range, the high level signal from the AND circuit AD2 clears the A/D converter ADC1 in such a case. There is provided a D flip-flop circuit group DFF1 which, under a no lens driving condition, operates in synchronism with the strobing signal produced from the voltage control oscillator VCO through the terminal T14 to take in, hold and produce, as new lens driving data, the computation signals which are obtained through the terminals T34, T44, T54, T64 and T74 and the A/D converter ADC1. Further, the number of flip-flop circuits connected to the A/D converter ADC1 corresponds to the number of bits of the converter ADC1. Under the condition of being within the AF convergence range, the low level signal produced from the AND circuit AD2 is inverted into a high level signal by the inverter circuit IN2. This signal causes a strobing signal to be produced from the terminal T14. In synchronism with this strobing signal, a D flip-flop DFF2 produces and supplies a high level signal to the terminals T124 and T24. This high level signal is a drive signal for driving the lens 1. When the lens 1 reaches an end position thereof, the drive control unit 14 which will be described later herein produces a lens end position signal of a high level. A terminal T94 is arranged to receive this signal. Another terminal T84 is arranged to receive a drive completion signal which is produced upon completion of a lens driving operation from the drive control unit 14. Therefore, upon completion of the driving operation or when the lens 1 is driven to reach an end position thereof, the lens driving operation is brought to an end with a reset signal produced from an OR circuit OR3 and supplied to the D flip-flop DFF2. After that, the operation of the unit is continuously performed on the basis of next data. A T flip-flop TFF1 is arranged to be inverted by the lens end position signal which is applied thereto from the terminal 94 upon arrival of the lens 1 at an end position thereof. The T flip-flop TFF1 produces a driving direction instructing signal and supplies the signal to a terminal T104 through an AND circuit AD3 and an OR circuit OR2.

An OR circuit OR1 produces a signal of a high level upon receipt of at least either the defocus degree determining signal from the D flip-flop DFF1 or the direction alone determining signal therefrom. An AND circuit AD4 is arranged to transmit either the defocus degree determining signal or the direction-alone determining signal when at least one of them is produced from the D flip-flop DFF1. A D flip-flop DFF3 is arranged to be caused to produce a high level signal by the clock action of the strobing signal of the terminal T14 received after receipt of an undetermined direction signal from the D flip-flop DFF1. When the undetermined direction signal is not received, the flip-flop DFF3 produces a low level signal with a low level signal inverted and supplied to the clear signal input terminal CL thereof. A terminal T174 is arranged to receive, before a shutter release operation is made once, a high level signal from an R-S flip-flop of the automatic exposure unit (see FIG. 7) which will be described later herein. The terminal T174 receives a low level signal from the R-S flip-flop after the first shutter release operation, that is, during a continuous photographing operation. A terminal T184 is arranged to transmit a high level signal which is representative of an undetermined direction to a NAND circuit ND4 of the automatic exposure unit. Another D flip-flop DFF4 is arranged to store a precedent driving direction instruction signal and to be clocked by the strobing signal from the terminal T14. An exclusive OR circuit EOR1 is arranged to obtain an exclusive logical sum of the current driving direction signal and the precedent driving direction signal from the above stated D flip-flop DFF4. When the degree of defocus is established, a divider circuit DIV2 divides the digital signal which comes from the D flip-flop DFF1 representing a degree of defocus by two, that is, shifts it by one bit, if the level of the output signal of the exclusive OR circuit EOR1 is high. The divider circuit DIV2 does not divide the digital signal and produces it as it is if the level of the signal from the exclusive OR circuit EOR1 is low. (Further details of the divider circuit DIV2 are as described in the preceding application filed by the present applicant). Accordingly, if the current instruction for the driving direction remains unchanged from the preceding instruction, the low level signal is produced at the divider circuit DIV2 irrespective of the direction. In that case, therefore, the digital signal from the D flip-flop DFF1 representing a degree of defocus is supplied to an AND circuit AD6 as it is. Meanwhile, with the determined defocus degree signal produced from the D flip-flop DFF1 at a high level, the direction-alone determining signal at a low level and the output signal of the AND circuit AD5 at a low level, AND circuits AD7 and AD8 are closed and a signal representative of a required driving extent is produced at a terminal T114 through an OR circuit OR4. When it is only the direction that is established, the required driving extent is arranged to be such a value that never causes driving to an extent beyond a range of determined defocus or a direction-alone determining range. For example, a code corresponding to 2 mm is given to a directional step device 41 which is formed, for example, by a presettable register as a constant, which may be varied according to the lens to be used, etc. This required driving extent is processed by the divider circuit DIV3 (which is described in detail in the preceding patent application) as it is if there is no change in the direction from preceding instruction or reduced to a half if there is a change in direction from the preceding instruction. The extent thus processed is then supplied through the OR circuit OR4 to the terminal T114 as a required driving extent signal. (At that instant, the AND circuits AD6 and AD8 are closed). In other words, even if the degree of defocus is erroneously or inaccurately indicated by the D flip-flop DFF4 and the exclusive OR circuit EOR1, the degree of defocus indicated by the current instruction is reduced to a half value thereof when the direction of the current instruction differs from that of the previous instruction. This circuit is very useful for quick convergence with oscillation effectively prevented thereby. A reference numeral 42 indicates an undeterminate step device which is formed, for example, with a presettable register and is arranged to define a lens driving extent in search of direction when the direction is undetermined. Further, for the sake of illustration, each of the circuit elements AD6-AD7 and OR4 are shown as a single element in the drawing. However, there are actually provided a number of circuits corresponding to the number of bits of the output terminals of elements connected to the input terminal of each element.

The circuit arrangement shown in FIG. 4 operates in the following manner: In the case where it is only the direction that is determined or established while the degree of defocus remains undetermined, the terminal T34 is at a low level, the terminal T64 at a high level and the terminal T74 at a low level. Therefore, the lens driving instruction is given to drive the lens in the determined direction only to an extent defined by the directional step device 41. Meanwhile, the output level of the OR circuit OR1 also becomes high to open the AND circuit AD4. Since the undetermined direction signal from the terminal T74 is at a low level, the D flip-flop DFF3 is cleared to have the AND circuits AD5 and AD3 closed. Accordingly, the defocus direction signal of the terminal T3 is given to the terminal T10 through the OR circuit OR2 to have the lens driven in that direction. Next, in the case where both the degree of defocus and the direction thereof are undetermined, or, in other words, when the degree of defocus is above a predetermined value, the terminals T54 and T64 are at a low level while the terminal T74 is at a high level. In this case of having both the degree and direction of defocus undetermined, there is the possibility that an erroneous following action might be caused by a momentary accident such as vibration of the camera or the like. However, if the undeterminate condition is intrinsic, a search is conducted over the whole region of the lens 1 so that adjustment of the lens 1 to an in-focus position can be accomplished. If the searching action is arranged to begin in response to mere momentary blurring or the like, such arrangement not only is disadvantageous in terms of operability of the camera but also would cause deviation from a tentatively adjusted in-focus point. To solve this problem, the searching action is arranged to be performed through a stabilizing circuit arrangement in the following manner: The D flip-flop DFF1 is set but another D flip-flop DFF3 is not set on the first occurrence of the undeterminate condition. The D flip-flop DFF3 is set only by the second occurrence of such a condition. However, at the time of continuous photographing, the AND circuit AD5 is closed since the input signal from the terminal T174 is at a low level. Accordingly, the AND circuits AD3 and AD4 are also closed and the level of the driving direction instruction signal of the terminal T104 becomes low. In the meantime, since the AND circuits AD6, AD7 and AD8 are also closed, the required driving extent signal is not supplied to the terminal T114 and the lens 1 is not driven. The focusing operation is thus inhibited in this instance. However, on two consecutive occurrences of the undeterminate condition, the D flip-flop DFF3 is set. In this instance, if the shutter release operation is made for the first time, the AND circuit AD5 opens as the input signal thereto from the terminal T174 is at a high level. Then the AND circuit AD8 also opens. This causes the lens driving constant for searching which is produced from the undeterminate step device 42 and which is of a value required for quickly searching the whole region of the lens 1 without missing the in-focus point or without overpassing a direction discernible range to be produced as a required driving extent signal and to be supplied via the OR circuit OR4 to the terminal T114.

Figure 5:
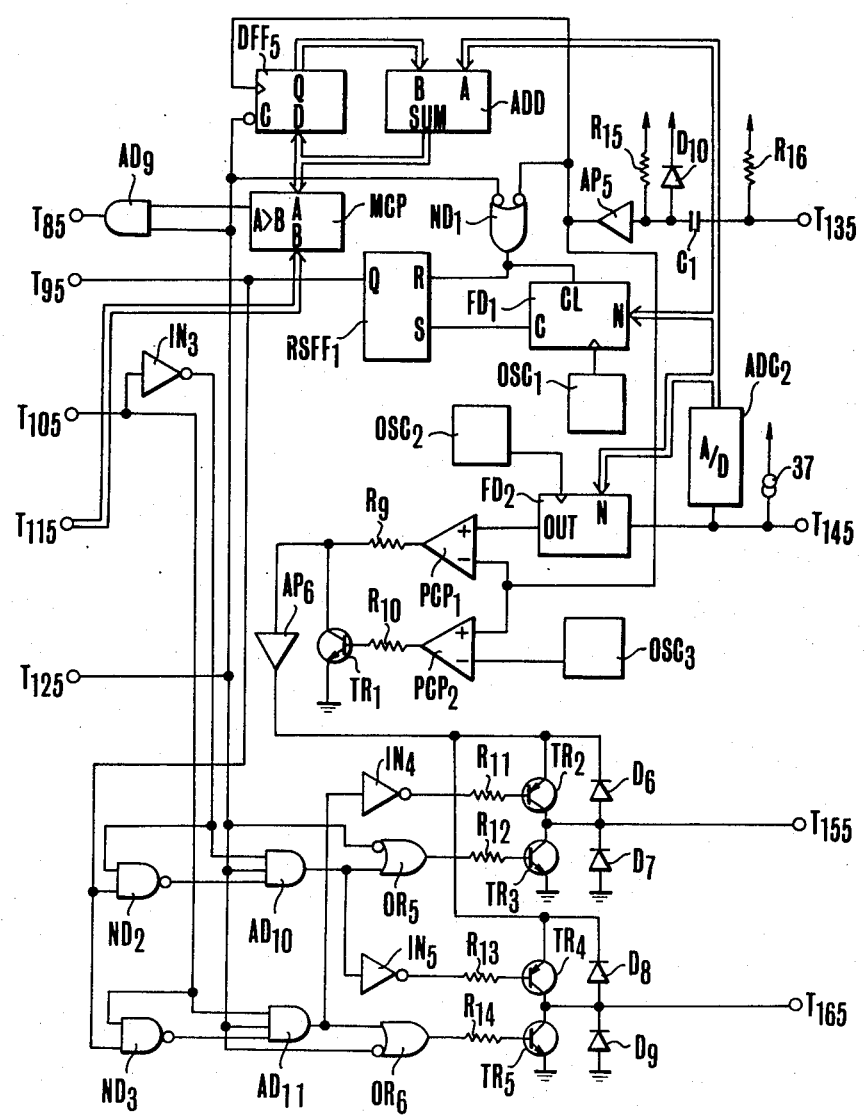
FIG. 5 is a circuit diagram showing a drive control unit of FIG. 2 as an embodiment example of the invention.

FIG. 5 is a circuit diagram showing by way of example the arrangement of the drive control unit 14 shown in FIG. 2. This drive control unit is arranged to have the lens 1 driven just to the driving extent demanded by the required driving extent signal which appears at the terminal T115 via the terminal T114 of the above stated drive instruction unit 13, in the driving direction shown by the driving direction instruction signal which appears at the terminal T105 via the terminal T104 and just for a period of time during which the drive signal appearing at the terminal T125 via terminal T124 remains at a high level. Meanwhile, as will be further described later herein, the lens drive unit 15 is provided with a motor 2 which is arranged to drive the lens 1 to move back and forth; and a pattern signal generator arranged to produce a comb-like signal which serves a monitor signal for monitoring the movement of the lens 1. The movable or shiftable extent of the lens 1 might vary according to the design or the zooming arrangement of the lens. Therefore, the lens drive unit 15 is provided with a code signal which represents the lens moving extent per unit signal of the comb-like signal or, to be more specific, represents the shifting extent of the focal plane per unit signal. The code signal indicative of the lens shifting extent per unit signal of the comb-like signal is arranged to be applied to a terminal T145. The lens shifting extent is then taken out in the form of a voltage value through a constant current circuit 37. This voltage is converted by an A/D converter ADC2 into a digital signal which is proportional to the shifting extent of the lens. The A/D conversion does not have to be linear and may be suitably determined during design work in relation to a signal to be produced on the lens side. In this embodiment, the largest shifting extent of lens 1 is set for the instance in which there is produced no code of the signal of the lens side, i.e. for an open condition, and is used for a lens shifting inhibition signal which will be described later herein. The unit includes the following arrangement:

(1) First, a lens drive monitor circuit is arranged in the following manner: A reference symbol R16 indicates a resistor which converts into a voltage signal the comb-like signal obtained at a terminal T135 according as the lens 1 is driven. A capacitor C1 and a resistor R15 are arranged to differentiate this voltage signal and to take out a change signal of the comb-like signal, i.e. the fall pulse of the signal. This signal is amplified by an amplifier AP5, which thereafter uses it as the variation pulse of the comb-like signal. A diode D10 prevents a high voltage from being applied to the amplifier AP5 due to a change of polarity of the comb-like signal.

(2) A computation circuit is arranged in the following manner: This computation circuit determines whether the lens has been driven to an extent demanded by the required driving extent signal which appears at a terminal T115 via the terminal T114. A D flip-flop DFF5 is arranged to store the extent to which the lens has been shifted up to now. An adder ADD is arranged to add up the lens shifting extent up to now as stored at the D flip-flop DFF5 and the shifting extent of the lens 1 per unit signal of the comb-like signal. There is provided a known value comparator MCP, such as a magnitude comparator, which is arranged to compare the required driving extent signal appearing at the terminal T115 with a lens driving extent signal produced from the adder ADD upon arrival of a next comb-like signal. When the former is larger than the latter, the comparator MCP produces a high level signal therefrom. An AND circuit AD9 is arranged to obtain the logical product of a drive signal coming from a terminal T125 which is connected to the terminal T124 and the output signal of the above stated value comparator MCP. Therefore, in the case where the driving extent is large when the next comb-like signal is received during a lens driving operation, a high level signal, i.e. a drive completion signal indicative of completion of driving to a required driving extent, is supplied to the drive instruction unit 13, which has been described in the foregoing, through the AND circuit AD9 and a terminal T85 which is connected to the terminal T84. With the drive completion signal thus supplied to the drive instruction unit 13, the lens driving operation is brought to a stop and a next distance measuring operation takes place. When the level of a drive signal of a terminal T125 which is connected to the terminal T124 is low, that is, under a no driving condition, the D flip-flop DFF5 is reset. Then, a driving extent before receipt of the comb-like signal is obtained from the change pulse of the comb-like signal produced from the amplifier AP5 and is supplied to the adder ADD, which performs an adding operation thereon. With the addition of the driving extent performed with the change pulse of the comb-like signal, driving control can be accomplished solely through addition and subtraction. Further, the pulse intervals of the comb-like signal are arranged to be defined by mechanical shifting and therefore permit sufficient computation during the intervals. This arrangement facilitates and simplifies the driving control and is more advantageous than arrangement to spend time for a more complex operation of multiplication and division at the initial stage of control.

(3) A lens shifting end detection circuit is arranged in the following manner: A reference symbol OSC1 indicates an oscillator; FD1 indicates a frequency divider which counts pulses produced from the oscillator OSC1 just up to a number shown by a signal produced from an A/D converter ADC2 and then produces a carry signal from a carry terminal C; ND1 indicates an inversion input OR (NAND) circuit for a signal from a terminal T125 and a signal from an amplifier AP5; and RSFF1 indicates an R-S flip-flop. The R-S flip-flop RSFF1 is arranged to be set when the carry signal is produced from the frequency divider FD1 and to produce a high level signal to supply it to a terminal T95 which is connected to the terminal T94. The flip-flop RSFF1 is reset by a signal produced from the NAND circuit ND1. This circuit arrangement operates in the following manner: Under a no driving condition, the signal of the terminal T125 is at a low level and the signal produced from the inversion input OR (or NAND) circuit ND1 at a high level. The R-S flip-flop RSFF1 is reset by this. Therefore, the terminal T95 does not receive from the R-S flip-flop RSFF1 any signal indicative of that the lens 1 is at its end position. Under a lens driving condition on the other hand, the signal of the terminal T125 is at a high level. Therefore, so long as the low level signal, i.e. the change pulse of the comb-like signal, is received from the amplifier AP5, the signal produced from the inversion input OR circuit ND1 is at a low level. This releases the frequency divider FD1 from a cleared state and causes it to begin counting the pulses from the oscillator OSC1. Upon completion of counting the number of pulses indicated by the signal from the A/D converter ADC2, the frequency divider FD1 comes to produce a carry signal to set thereby the R-S flip-flop RSFF1. The level of the terminal T95 then becomes high. This means that the change pulse of the comb-like signal is not yet produced from the amplifier AP5 even after the lapse of a certain length of time from the beginning of the lens driving operation. In other words, when the lens 1 does not move, a signal indicative of that the lens 1 is at an end position is produced to the terminal T95. If a comb-like pulse comes within this length of time, the level of the signal produced from the amplifier AP5 of course becomes low and the level of the signal produced from the inversion input OR circuit ND1 becomes high. The high level output signal of the OR circuit ND1 clears the frequency divider FD1. Then no carry signal is applied to the R-S flip-flop RSFF1. The terminal T95 then remains at a low level. Whether or not the lens 1 is in an end position is thus detected by the presence or absence of the change pulse of the comb-like signal. Therefore, it suffices to use only one drive monitor signal. Further, even if the pulse interval of the comb-like signal comes to vary at the focal plane due to a change in the kind of the lens, the end detecting power can be always adjusted according to a degree of defocus as reduced to the focal plane because the frequency dividing ratio of the frequency divider FD1 is arranged to be adjustable by a code signal which is representative of a lens driving extent per unit signal of the comb-like signal coming from the terminal T145. This arrangement ensures appropriate determination without fail. A next sampling operation is performed through the OR circuit OR3 according to a lens end position signal which is produced from the terminal T95. Further, the searching direction is reversible by the T flip-flop TFF1 so that the search can be carried out over the whole region of the lens.

(4) A lens drive power control circuit is arranged in the following manner: This circuit is arranged to compensate variations in the period of the comb-like signal or the motor which sometimes varies according to the lens. The circuit arrangement includes an oscillator OSC2; a frequency divider FD2 which is arranged to count pulses produced from the oscillator OSC2 just for a number of pulses indicated by a signal produced from an A/D converter ADC2 and to produce a high level signal therefrom after completion of the count; and a PLL phase comparator PCP1 which is provided with a low-pass filter for its output and is arranged to compare the phase of the output signal of the frequency divider FD1 with that of the change pulse of the comb-like signal. When the latter is larger than the former, that is, when the change pulse of the actual comb-like signal is slower than a signal indicative of the driving extent per unit comb-like signal which is an adjusting extent, the comparator PCP1 produces a high level signal. When the former is larger than the latter, the comparator produces a low level signal therefrom. The circuit arrangement also includes an amplifier AP6 which is arranged to increase a current for driving the motor 2 in response to the signal produced from the phase comparator PCP1. The amplifier AP6 is provided with a protecting resistor R9. The signal produced from the amplifier AP6 is used for applying feedback to the motor in such a manner as to obtain a change pulse of phase which is the same as that of the signal indicative of the driving extent per unit comb-like signal representing an adjustment extent. This arrangement prevents variations in the response speed of the lens 1 and also prevents the above stated lens shifting end detecting circuit from making an erroneous action. There is provided another PLL phase comparator PCP2 which is arranged to compare the phase of the change pulse of the actual comb-like signal produced from the amplifier AP5 with that of the pulse produced from an oscillator OSC3. In case where the period of the change pulse of the actual comb-like signal is abnormally fast, the output level of the comparator PCP2 becomes high to turn on thereby a transistor TR1 through a resistor R10. With the transistor TR1 thus turned on, speed control by the phase comparator PCP1 to make the shifting extent at the focal plane unvarying is restricted. In other words, with the transistor TR1 turned on, the level of the input signal to the amplifier AP6 is lowered. This restricts the drive current for the motor 2 to lower the speed of the motor. This arrangement thus permits use of different lenses and drive systems.

(5) A motor driving circuit is arranged as follows: A reference symbol ND2 indicates a NAND circuit arranged to receive the lens end position signal which is produced from the R-S flip-flop RSFF1 and supplied to the terminal T95 and to receive also the driving direction instructing signal which comes from a terminal T105 connected to the terminal T104 and has its level inverted by an inverter circuit IN3. A symbol ND3 indicates a NAND circuit which is arranged to receive the lens end position signal supplied from the R-S flip-flop RSFF1 to the terminal T95 and the driving direction instructing signal coming from the terminal T105. A symbol AD10 indicates an AND circuit. The AND circuit AD10 is arranged to receive three signals including a drive signal coming from a terminal T125, a signal produced from the NAND circuit ND2 and the driving direction instructing signal which comes from the terminal T105 and the level of which is inverted by the inverter circuit IN3. Another AND circuit AD11 is arranged also to receive three signals including the drive signal coming from the terminal T125, a signal produced from the NAND circuit ND3 and the driving direction instructing signal coming from the terminal T105. Inverter circuits IN4 and IN5 are arranged for signals produced from the AND circuits AD11 and AD10 respectively. A symbol OR5 indicates an OR circuit which is arranged to receive the signal produced from the AND circuit AD10 and the drive signal of the terminal T125 after it has been inverted. Another OR circuit OR6 is arranged to receive the signal produced from the AND circuit AD11 and the drive signal of the terminal T125 after it has been inverted. The circuit arrangement further includes PNP type transistors TR2 and TR4; NPN type transistors TR3 and TR5; current limiting resistors R11, R12, R13 and R14 which are provided respectively for the transistors TR2, TR3, TR4 and TR5; diodes D6, D7, D8 and D9 which are arranged to protect the transistors TR2, TR3, TR4 and TR5 from being damaged by the back electromotive voltage of the motor, and output terminals T155 and T165 for the current driving the motor 2.

Under a no driving condition, the drive signal of the terminal T125 is at a low level. Therefore, the level of the signal produced from the AND circuit AD10 is low. This signal is inverted by the inverter circuit IN5 into a high level. This high level signal turns off the PNP transistor TR4 through the resistor R13. Meanwhile an inverted input of the drive signal causes a signal produced from the OR circuit OR5 to become a high level. The high level signal from the OR circuit OR5 causes the NPN transistor TR3 to turn on via the resistor R12. A signal produced from the AND circuit AD11 is also at a low level. This low level signal is inverted into a high level by the inverter circuit IN4. The inverted high level signal from the AND circuit AD11 turns off the PNP transistor TR2 via the resistor R11. A signal produced from the OR circuit OR6 is caused to become a high level by an inverted input of the drive signal. This signal from the OR circuit OR6 turns the NPN transistor TR5 on via the resistor R14. With the NPN transistors TR3 and TR5 thus turned on, the motor terminals T155 and T165 is short-circuited by the diodes D7 and D9 to have electromagnetic brake applied to the motor.

Under a condition where the lens 1 has not reached its end position, the signal produced from the R-S flip-flop RSFF1 is at a low level. Therefore, the signals produced from the NAND circuits ND2 and ND3 are at a high level. Assuming that the driving direction instructing signal from the terminal T105 is at a high level under this condition, when the level of the drive signal of the terminal T125 is made to become high for driving, the level of the signal produced from the AND circuit AD11 becomes high. Accordingly, the level of the signal produced from the OR circuit OR6 also becomes high to turn the NPN transistor TR5 on. Then a low level output signal of the inverter circuit IN4 turns the PNP transistor TR2 on. Meanwhile, since the signal produced from the AND circuit AD10 is at a low level, the level of a signal produced from the OR circuit OR5 becomes low to turn the NPN transistor TR3 off. A high level output signal of the inverter IN5 then turns off the transistor TR4. Therefore, a signal produced from the amplifier AP6 is applied to the terminal T155 of the motor 2. The terminal T165 is grounded and the motor 2 is driven to rotate in the prescribed direction. Upon arrival of the lens 1 at its end position, the level of the signal produced from the NAND circuit ND3 becomes low to bring the lens driving operation to an end.

In driving the motor 2 in the direction reverse to the direction mentioned in the foregoing, the level of the lens driving direction instructing signal of the terminal T105 is made to become low and that of the drive signal of the terminal T125 to become high. Since the level of the signal produced from the AND circuit AD10 then becomes high, the level of the signal produced from the OR circuit OR5 also becomes high to turn the NPN transistor TR3 on. Then, since the level of the signal produced from the inverter circuit IN5 becomes low, the PNP transistor TR4 also turns on. Meanwhile, since the level of the signal produced from the AND circuit AD11 becomes low, the level of the signal produced from the OR circuit OR6 becomes low and that of the signal produced from the inverter circuit IN4 high to turn off the PNP transistor TR2 and the NPN transistor TR5. Therefore, the signal produced from the amplifier AP6 is supplied to the terminal T165 via the PNP transistor TR4. The other terminal T55 on the other hand is grounded with the NPN transistor TR3 turned on to have the motor 2 driven to rotate in the direction reverse to the direction mentioned in the foregoing. When the lens 1 comes to another end position thereof, the level of the signal produced from the NAND circuit ND2 becomes low to bring the driving operation on the motor 2 to a stop. In case where the driving operation is brought to a stop by making the level of the drive signal of the terminal T125 low, the brake is applied to the motor 2 in the same manner as mentioned in the foregoing.

Figure 6:
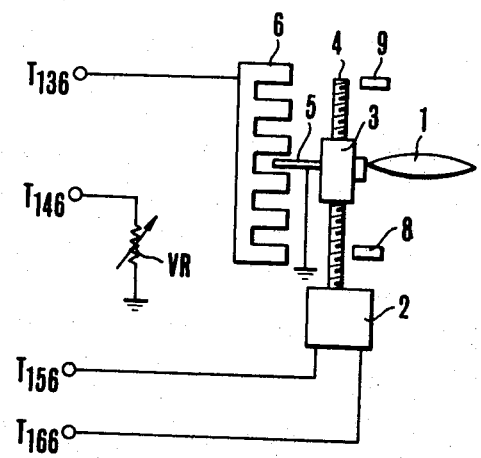
FIG. 6 is a schematic illustration of arrangement of a lens drive unit of FIG. 2.

FIG. 6 illustrates by way of example the arrangement of the lens drive unit 15 shown in FIG. 2. Referring now to FIG. 6, a reference numeral 1 indicates a lens which, in the case of a single-lens reflex camera, corresponds to a photo-taking lens. The arrangement includes a motor 2 arranged to be driven by control signals coming through a terminal T156 connected to the terminal T155 and another terminal T166 connected to the terminal T165. The motor 2 is provided with a known reduction mechanism 3 and 4 and is mounted on the part 3 of the reduction mechanism. A mechanism similar to this also may be arranged to shift just a part of the lens group instead of shifting the whole lens group. A brush 5 is secured to the reduction mechanism and is grounded. A numeral 6 indicates a pattern for generating a pattern signal. The comb-like signal which has been mentioned in the foregoing and which serves as a monitor signal is produced jointly by the brush 5 and the pattern signal generator and is supplied to a terminal T136 connected to the terminal T135 according as the lens 1 is shifted. Further, a code signal which represents a lens driving extent or, more exactly stated, represents a focal plane shifting extent per unit signal of the comb-like signal is produced and supplied via a variable resistor VR to a terminal T146 connected to the terminal T145. The provision of this code signal renders the value of the variable resistor VR variable according to zooming, so that variations in the lens driving extent and the focal plane shifting extent due to zooming can be transmitted to compensate the lens driving extent for the variation as required. Members 8 and 9 are arranged to restrict the forward and backward shifting of the lens 1. The above stated end detecting circuit detects that the reduction mechanism 3 abuts either on the forward shifting restricting member 8 or the backward shifting restricting member 9 and then brings the driving operation on the lens 1 to a stop. This arrangement thus permits the process which is required when the lens 1 comes to an end position without use of any additional switch or connection.

The drive control method of this embodiment is advantageously suited for the signal from the focus detecting unit irrespective as to whether the blurring type or the correlation type is employed though there is some difference between them in terms of reliability of the signal. As regards motor driving, the lens 1 may be shifted from a driver stage by means of any suitable one selected from different kinds of motors such as a stepping motor. For obtaining the comb-like signal, an electromagnetic pickup arrangement may be used in place of use of electrical contact arrangement. Further, since it is important to detect the ends of shifting, other arrangements using coil elements, hole elements, etc. are likewise usable. Further, it goes without saying that fine pulses can be detected without much chattering by using a photo interrupter or a photo sensor of the reflection type. In this embodiment, the operation after completion of shifting is performed by addition. However, this operation may be performed by subtraction instead of addition. Further, the operation for lens driving, including defocus computation by the divider DIV1 shown in FIG. 3, can be carried out solely by subtraction without including any multiplication and division.

Figure 7:
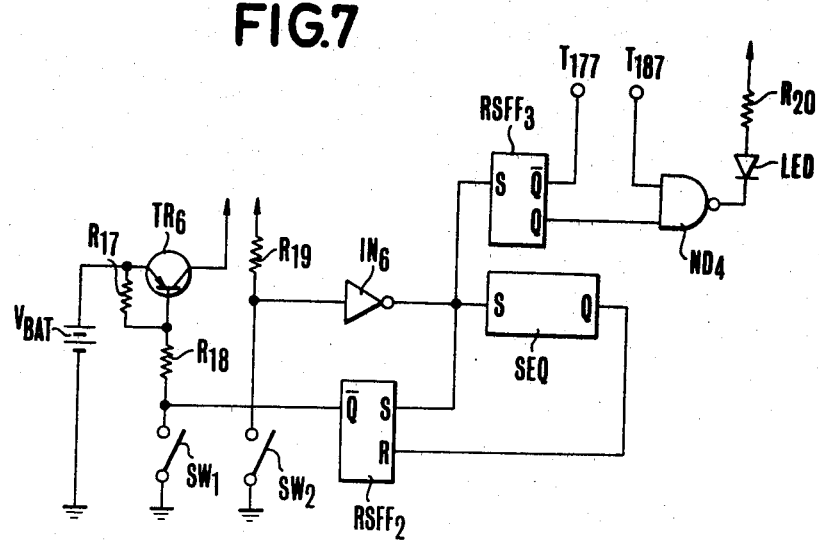
FIG. 7 is a circuit diagram of an automatic exposure unit of FIG. 2.

FIG. 7 is a circuit diagram showing by way of example the arrangement of the automatic exposure unit 16 shown in FIG. 2. Referring to FIG. 7, the unit is provided with a power source $V_{BAT}$. A switch SW1 is arranged to be turned on by the power source and the first stroke of a depressing operation on a shutter release button which is not shown. A transistor TR6 is arranged to permit power supply to other units which have been described in the foregoing when it is turned on. Resistors R17 and R19 are provided for pull up while a bias resistor R18 is provided for the transistor TR6. A switch SW2 is arranged to be turned on by the second stroke of the operation on the release button. The unit includes an inverter circuit IN6; a known exposure sequence circuit SEQ which begins to operate when a high level signal is supplied thereto via the inverter circuit IN6 after the switch SW2 is turned on; and an R-S flip-flop RSFF2. During the process of an exposure, a set signal is supplied to the set signal input terminal of the R-S flip-flop RSFF2; and the level of a signal produced from the inversion output terminal $\overline{Q}$ thereof is kept low to keep the transistor TR6 on to hold power supply to each of other units until a pulse representative of completion of the exposure sequence is supplied to the reset signal input terminal R thereof from the exposure sequence circuit SEQ. Another R-S flip-flop RSFF3 is arranged to be set when the switch SW2 turns on and to supply a low level signal from its inversion output terminal $\overline{Q}$ to a terminal T177 connected to the terminal T174 and a high level signal from its non-inversion output terminal Q to a NAND circuit ND4. Before a shutter is released once, a high level signal is thus produced at the terminal T177. This causes a high level signal to be supplied to the AND circuit AD5 shown in FIG. 4 to permit a focusing operation to a great extent. After the first shutter release, the transistor TR6 turns off to make the level of signal supplied to the terminal T177 low until the power supply to other unit is cut off in such a way as to prevent any erroneous focusing operation by inhibiting the focusing operation from being effected to a great extent. In this instance, if a high level signal which is an undetermined direction signal comes from a terminal T187 connected to the terminal T84, the output level of the NAND circuit ND4 becomes low. The low level output of the NAND circuit ND4 causes a light emitting diode LED to light up through a resistor R20 to give thereby a warning against excessive defocus during continuous photographing. It goes without saying that, during an exposure, the automatic focusing (AF) operation is inhibited as well known.

Figure 8:
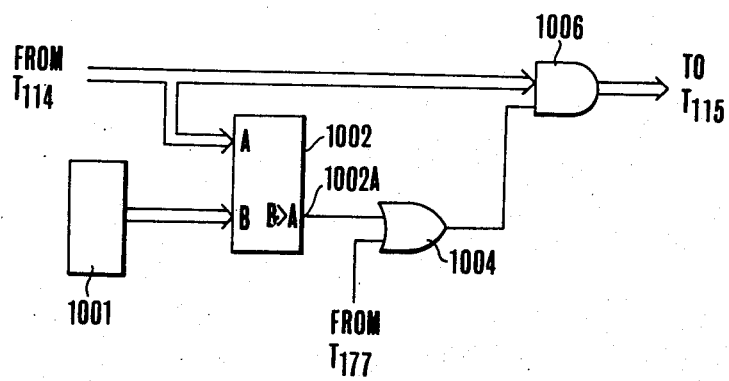
FIG. 8 is a circuit connection diagram showing another embodiment example of the invention.

FIG. 8 is a circuit connection diagram showing another embodiment of the invention. In the embodiment described in the foregoing, a certain restriction is imposed solely on the search to be made at the time of indetermination. In the case of FIG. 8, however, a certain restriction is imposed also on the required driving extent. Referring to FIG. 8, the embodiment includes a constant setting element 1001 which is formed, for example, by a register and is provided with an output terminal having a plurality of bits connected to one of the input terminals of a magnitude comparator 1002. The other input terminal of the magnitude comparator 1002 is connected to the terminal T114 shown in FIG. 4 to receive the required driving extent signal therefrom. Further included in the embodiment are an OR gate 1004 which has an input terminal connected to the output terminal 1002A of the comparator 1002 and another input terminal connected to the terminal T177 shown in FIG. 7; and an AND gate 1006. While FIG. 8 shows only one AND gate 1006 for the sake of simplification of illustration, there are actually arranged a number of AND gates 1006 corresponding to the number of bits of the terminal T114 shown in FIG. 4. These AND gates are arranged to be controlled by the output of the OR gate 1004. As have been described in the foregoing, the AND gates or circuits AD6, AD7 and AD8 are also arranged in the same manner as the AND gate 1006.

In this embodiment, if the value of the required driving extent signal from the terminal T114 is smaller than a value set at the setting element 1001 and not exceeding, for example, 1 mm, the level of the output terminal 1002A of the comparator 1002 becomes high only in that instance. Then the AND gate 1006 is opened by the output of the OR gate 1004 to allow the required driving extent signal to be transferred to the terminal T115 shown in FIG. 5. This arrangement inhibits the focusing operation from being performed to an excessive extent during continuous photographing. Other circuit elements are arranged in the same manner as in the first example of embodiment and, therefore, are omitted from description here.

Figure 9:
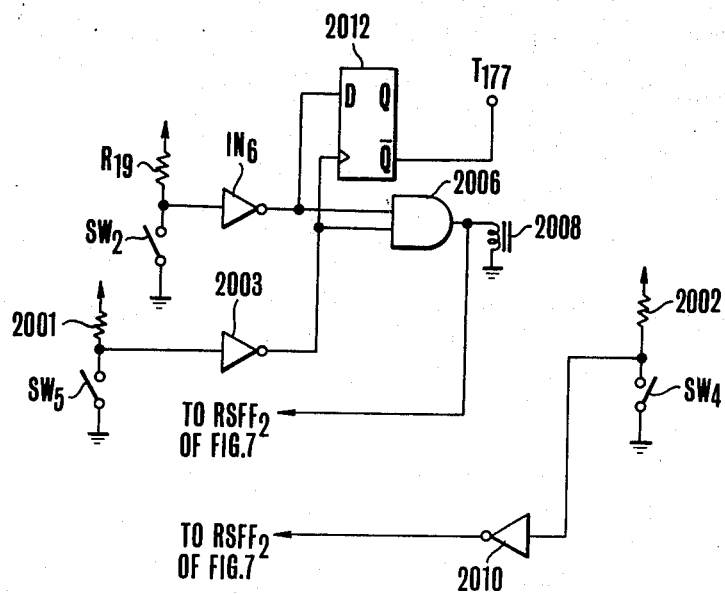
FIG. 9 is a circuit connection diagram showing a further embodiment example of the invention.

FIG. 9 is a circuit diagram showing another example of the circuit provided in the first embodiment for determining whether the camera is in a continuous photographing operation (FIG. 7). Referring to FIG. 9, the circuit arrangement in this case includes pull-up resistors 2001 and 2002; a switch SW5 which turns on upon completion of film (not shown) winding; a switch SW4 which turns off when a shutter (not shown) is closed; a switch SW2 which is identical with the switch SW2 shown in FIG. 7; inverters 2003, 2010 and IN6; an AND gate 2006; and a D flip-flop circuit 2012. The output terminal Q of the flip-flop circuit 2012 is connected to the terminal T174 of FIG. 4 via a terminal T177. In this case, the terminal T177 shown in FIG. 7 is not connected to the terminal T174 of FIG. 4. The output terminal of the AND gate 2006 is connected not only to the set input terminal of the flip-flop RSFF2 of FIG. 7 but also to a magnet 2008 which is provided for the purpose of releasing a mechanism of the camera. The output terminal of the inverter 2010 is connected to the reset input terminal R of the flip-flop RSFF2 of FIG. 7. The operation of this example is as follows: When a release operation is performed after completion of film winding, the output level of the AND gate 2006 becomes high to energize the magnet 2008. Then the shutter of the camera is released and an exposure begins. During the exposure, the flip-flop RSFF2 of FIG. 7 remains in a set state as the output of the inverter 2010 is at a low level and the power supply to each circuit is kept on.

In the case of continuous photographing, the flip-flop circuit 2012 is set by a winding completion signal from the inverter 2003 as the switch SW2 remains on. The level of the output terminal $\bar{Q}$ of the flip-flop then becomes low to produce from the terminal T177 a signal indicative of that continuous photographing is being performed. Other parts of arrangement and operation are identical with those of the first embodiment and, therefore, are omitted from description here.

In accordance with the present invention, as has been described in the foregoing, the focusing operation is arranged to be inhibited in case where a great degree of defocus results from an erroneous following action during continuous photographing. Therefore, the arrangement according to the invention effectively solves the problem mentioned in the foregoing. What we claim:

1. A focusing device for an optical system, comprising:
    (a) first means for generating a first signal indicative of that a continuous photographing operation is being performed;
    (b) second means for generating a second signal indicative of that the degree of defocus exceeds a prescribed value; and
    (c) third means for generating a control signal to inhibit any focusing operation when both the first and second signals are generated.

* * * * *